United States Patent
Tidwell et al.

(10) Patent No.: US 6,437,789 B1
(45) Date of Patent: Aug. 20, 2002

(54) MULTI-LEVEL CACHE CONTROLLER

(75) Inventors: Reed Tidwell, Centerville; Gary Pimentel, Salt Lake City, both of UT (US)

(73) Assignee: Evans & Sutherland Computer Corporation, Salt Lake City, UT (US)

(*) Notice: Subject to any disclaimer, the term of this patent is extended or adjusted under 35 U.S.C. 154(b) by 0 days.

(21) Appl. No.: 09/253,474

(22) Filed: Feb. 19, 1999

(51) Int. Cl.[7] ................................................ G09G 5/36
(52) U.S. Cl. ....................... 345/557; 345/531; 345/537; 345/557
(58) Field of Search .................. 345/531, 532, 345/536–538, 557, 558, 556; 711/105, 100, 118, 131, 138–140

(56) References Cited

U.S. PATENT DOCUMENTS

| | | | |
|---|---|---|---|
| 5,276,849 A | * 1/1994 | Patel | 711/141 |
| 5,430,888 A | 7/1995 | Witek et al. | |
| 5,544,306 A | * 8/1996 | Deering et al. | 345/545 |
| 5,544,340 A | 8/1996 | Doi et al. | |
| 5,557,733 A | * 9/1996 | Hicok et al. | 345/557 |
| 5,559,952 A | * 9/1996 | Fujimoto | 395/557 |
| 5,586,291 A | * 12/1996 | Lasker et al. | 711/113 |
| 5,598,517 A | 1/1997 | Watkins | |
| 5,696,947 A | * 12/1997 | Johns et al. | 345/571 |
| 5,734,386 A | 3/1998 | Cosman | |
| 5,761,709 A | * 6/1998 | Kranich | 711/122 |
| 5,909,225 A | * 6/1999 | Schinnerer et al. | 345/557 |
| 6,141,025 A | * 10/2000 | Oka et al. | 345/557 |

OTHER PUBLICATIONS

Deering et al., "FBRAM: A new Form of Memory Optimized for 3D Graphics", Computer Graphics Proceedings, Annual Conference Series, 1994.
Mitsubishi Electronics Device Group, *3D–RAM*, "Overview of 3D–RAM and Its Funcitonal Blocks".

* cited by examiner

Primary Examiner—Kee M. Tung
(74) Attorney, Agent, or Firm—Thorpe North & Western, LLP

(57) ABSTRACT

A method and apparatus for accessing a cache memory of a computer graphics system, the apparatus including a frame buffer memory having a graphics memory for storing pixel data for ultimate supply to a video display device, a read cache memory for storing data received from the graphics memory, and a write cache memory for storing data received externally of the frame buffer and data that is to be written into the graphics memory. Also included is a frame buffer controller for controlling access to the graphics memory and read and write cache memories. The frame buffer controller includes a cache first in, first out (FIFO) memory pipeline for temporarily storing pixel data prior to supply thereof to the cache memories.

11 Claims, 5 Drawing Sheets

Read Cache Flags 22

Write Cache Flags 24

MULTI-LEVEL CACHE CONTROLLER

BACKGROUND

1. The Field of the Invention

This invention relates generally to cache memory. More specifically, the invention relates to a new method and apparatus for controlling a frame buffer cache memory so as to increase throughput by hiding cache misses, and minimizing reducing latency for cache hits.

2. The State of the Art

One of the traditional bottlenecks of 3D graphics rendering hardware is the rate at which pixels are capable of being rendered into a frame buffer. Modern computer systems are tasked with rendering increasingly more detailed three dimensional environments at frame rates which attempt to portray fluid motion on a display. Unfortunately, it is a challenge to deliver such performance at desktop computer prices.

The challenges to rendering richly textured three dimensional environments on a computer display are detailed in Deering, Michael F., Schapp, Stephen A., Lavelle, Michael G., *FBRAM: A New Form of Memory Optimized for 3D Graphics*, Computer Graphics Proceedings, Annual Conference Series, 1994, published by Siggraph. The article explains that the performance of hidden surface elimination algorithms has been limited by the pixel fill rate of 2D projections of 3D primitives.

When trying to increase fill rates and rendering rates, designers have generally been forced to make a tradeoff between latency and throughput. Essentially, latency has been sacrificed to achieve greater throughput. If high throughput is desired, cache misses are hidden by pipelining accesses to cache memory (hereinafter simply referred to only as cache). The number of states in the pipeline is equal to the worst case time required to load a slot in the cache. This effectively delayed cache access to the point that even in the case of a miss in a system having two levels of cache, the pipeline would not have to halt because the cache is always capable of being loaded by the time the access was actually performed.

Regarding the two levels of cache mentioned above, two levels of cache are implemented when controlling the cache of a frame buffer. The first level comprises an SRAM pixel buffer. The second level comprises implementation of sense amps on the banks of DRAM. This is also explained in the Deering et al article. The present invention is directed mainly to improving cache performance at the first level. However, the result is an improvement in single and multi-level cache.

As explained previously, the consequence of implementing cache pipelining to increase throughput is added latency on cache hits. In other words, if an access was required that happened to be a hit, the access would be delayed by the entire built-in pipeline delay, even though it is immediately accessible in the cache. The delay would also occur even when there are no valid accesses ahead of it in the pipeline. An "access" is defined as an attempt to retrieve data from or send data to the cache, but if not a hit, then from the DRAM.

This degree of latency could not always be tolerated. The alternative was to allow hit accesses to be executed without delay. However, when a miss occurred, processing had to stop until the cache was loaded. Thus it is easy to recognize the delays in throughput. This type of frame buffer cache controller is implemented in many systems today.

In the frame buffer of a graphics system, maximum throughput is generally the most important consideration. For example, 3D rendering produces a more or less constant stream of pixels to be written. 3D fill rate performance on a cached graphics system is directly proportional to the percentage of cache accesses that can be hidden using pipelining.

In contrast, memory mapped accesses from a host computer are not continuous, but are usually separated by one or more dead states. Because these accesses occur via the global system PCI or AGP bus, it is important that they tie up the bus for the least amount of time possible. Therefore, this situation requires minimal latency.

For example, in a series of single pixel read operations, the transfer of data is held up until valid data from the frame buffer is ready. If the read is a hit, it is undesirable that this time would include the same latency as if it were a miss at both levels of the cache (as would occur if accesses were pipelined for maximum throughput).

The prior art cache controllers also teach reading in each block that is to be manipulated in cache from DRAM, and always writing back each block to DRAM to thereby make sure that the latest data is always available from DRAM. This function basically ignores, for example, situations when the data in cache is read-only, and does not need to be written back to DRAM which otherwise causes excessive cache traffic.

Therefore, it would be an advantage over the state of the art to provide a multi-level cache controller which is able to automatically adjust and provide either high throughput or reduced latency, depending upon the circumstances. Another improvement would be to reduce overall cache traffic to thereby free up the system bus.

OBJECTS AND SUMMARY OF THE INVENTION

It is an object of the present invention to provide a method and apparatus for balancing cache throughput and latency in accordance with the type of accesses being made of cache.

It is also an object to provide a method and apparatus for increasing cache throughput for generally continuous accesses of cache.

It is a further object to provide a method and apparatus for providing reduced cache latency for generally intermittent cache accesses.

It is still another object to provide a method and apparatus for implementing an expandable and collapsible cache pipeline for balancing cache throughput and latency.

It is an additional object to provide a method and apparatus for implementing an expandable and collapsible cache pipeline which is able to adjust to different DRAM speeds and cache controller clock rates.

It is another object to provide a method and apparatus for reducing cache traffic to thereby free up the system or graphics bus.

It is still a further object to provide a method and apparatus for separating a read cache from a write cache, to thereby reduce bus traffic.

It is another object to provide a method and apparatus for reducing bus traffic by only reading those blocks into cache memory which need to be read, and only writing those blocks back to cache memory that must be written back to maintain currency of data.

It is also an object to provide apparatus that enables accesses to cache to be executed at the earliest possible state that will result in a valid access.

It is another object to provide a method and apparatus for enabling effective parallel processing of DRAM accesses and cache accesses.

The presently preferred embodiment of the invention is a method and apparatus for providing an expandable cache pipeline in the form of a first in, first out (FIFO) memory for interfacing with separate read and write caches of a frame buffer, for example, wherein selective reading from DRAM (or other memory) and writing to DRAM (or other memory) reduces bus traffic, thereby increasing throughput. Throughput is also increased (or latency reduced) by providing an expandable cache pipeline.

In a first aspect of the invention, an interlock unit adjusts delays in pixel read/write paths of a graphics display system by allowing or preventing accesses to cache until the earliest possible state that will result in a valid access.

In a second aspect of the invention, the cache pipeline expands when there is a continuous stream of pixels being received faster than the frame buffer can accept. The pipeline collapses, causing the FIFO memory to empty, when the frame buffer is able to accept the pixels faster than they are being supplied.

In a further aspect of the invention, a reduction in cache traffic is achieved by providing separate read and write caches.

These and other objects, features, advantages and alternative aspects of the present invention will become apparent to one skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

It is useful to have an overview of the present invention before delving into the detailed description of the preferred embodiment. Accordingly, it is observed that the present invention involves a cache controller and cache memory including an expandable cache pipeline that is implemented as a first in, first out (FIFO) memory in the pixel read/write paths. An interlock unit manages the pipeline by controlling and synchronizing commands issued to a frame buffer which includes the cache memory.

The results of this new cache structure and cache controller are seen as reduced bus traffic, and a system which is able to optimize the cache memory for increased throughput, or reduced latency.

For example, assume a stream of pixels is sent to a frame buffer which includes a cache memory portion and a slower system memory portion. The first pixels to arrive at the frame buffer are likely to be cache misses. In other words, the pixel data will not be in the cache yet because there have not been any previous accesses. This causes the pipeline (FIFO) to fill to a certain point as it waits for a first slot in cache to be loaded. However, a rasterizing pipeline that generates the pixels does not stop. Assuming that the rasterizer uses the Watkins method of multi-level scanning (see U.S. Pat. No. 5,598,517) most of the pixels arriving at the frame buffer will eventually be hits. When subsequent misses do occur, the cache operations will not cause pixel processing to halt because cache load requests can be executed before the missed access gets read from the system memory portion. When there is not a continuous stream of pixel accesses, the pipeline empties, effectively collapsing the pipeline and thereby enabling any accesses to go through with minimum latency.

Therefore, it should now be apparent that the only time when upstream processing stops is when there is a sequence of cache misses, or an extraordinary delay in executing a system memory portion command which causes the pipeline to fill. In any case, the latency will be the minimum required to ensure that the cache is properly loaded.

Figure 1:
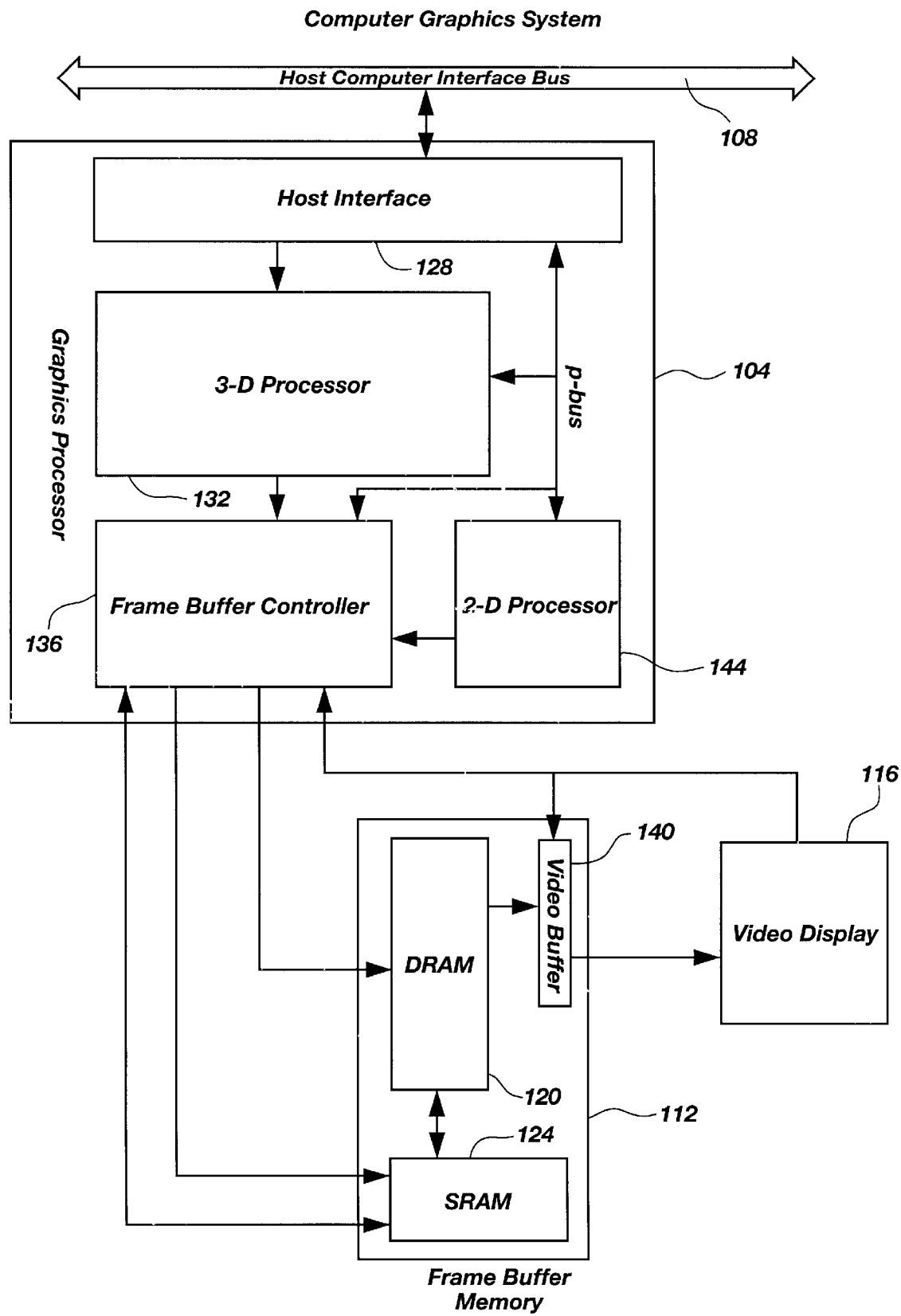
FIG. 1 is a block diagram illustrating one embodiment of a computer graphics system utilizing a frame buffer controller in accordance with the principles of the present invention.

With this introduction to the invention in mind, we now examine a detailed example implementation of the presently preferred embodiment. FIG. 1 shows a block diagram of a computer graphics system for producing video displays in accordance with the present invention. Included is a graphics processor 104 which interfaces with a host computer (not shown) via an interface bus 108. Also included is a frame buffer memory 112 and a video display unit 116 on which graphic or video display information is produced.

The graphics processor 104 receives graphics primitive data (e.g. polygon data), control data, and pixel data from the host computer via the bus 108 and also sends control data and pixel data to the host computer via the bus. The graphics processor 104 also receives video timing control signals from the video display unit 116 and sends control data for reading from and/or writing to the frame buffer memory 112. This control data provides for controlling the reading from and writing to dynamic random access memory (DRAM) 120 and static random access memory (SRAM) 124, the latter of which acts as a cache memory for the frame buffer. The graphics processor 104 also sends data to and receives data from the frame buffer memory 112.

The graphics primitive data received from the host computer is supplied via a host interface 128 to a 3D processor 132 which processes the data and produces pixel data which is supplied to a frame buffer controller 136.

The frame buffer controller 136 controls access for reading and writing pixel data from and to the frame buffer 112. In effect, the frame buffer controller 136 produces commands for controlling the loading of pixel data in the frame buffer memory 112 for ultimate supply of such data to a video buffer 140. The video buffer 140 sends the data to the video display 116 which displays the image represented by the pixel data.

The graphics processor 104 also includes a 2D processor 144 which controls transfer of rectangular regions of pixels from one area of the display to another. This action is referred to as a block level transfer (BLT). The 2D processor 144 also controls the transfer of rectangular regions of pixels to or from the host computer.

The above-described operation and organization of the computer graphics system of FIG. 1 is known. The present invention resides in the organization and operation of components of the frame buffer controller 136 and the frame buffer memory 112.

Figure 2:
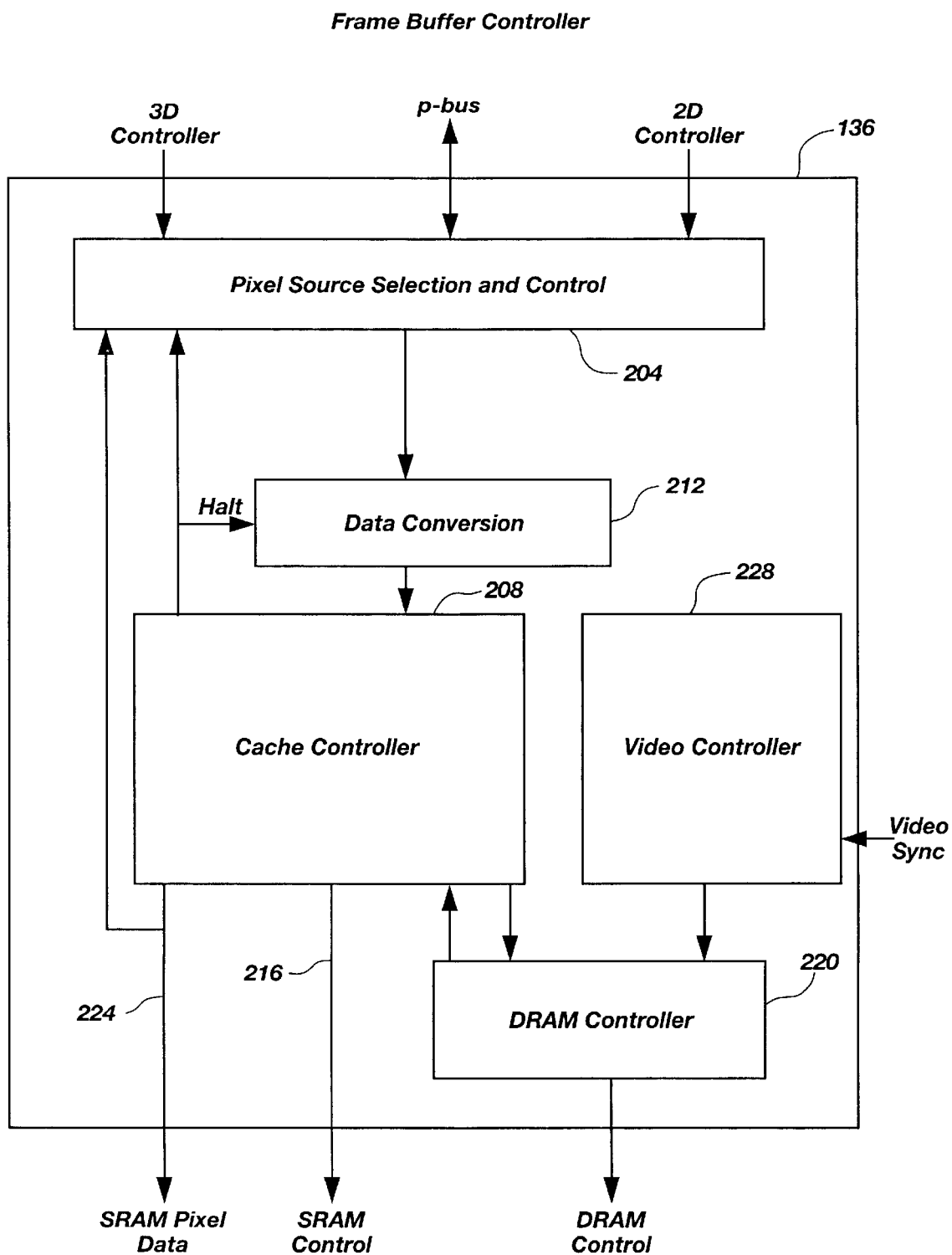
FIG. 2 is a block diagram of the frame buffer controller of FIG. 1 utilizing a cache controller in accordance with the present invention.

FIG. 2 is a block diagram of the frame buffer controller 136 of FIG. 1, constructed in accordance with the present invention. The frame buffer controller 136 includes a pixel source selection and control unit 204 which selects one of three sources of pixel data, the 3D processor 132 (FIG. 1), the P-bus, or the 2D processor 144, from which to receive pixel data or to which to send pixel data. It also receives data from SRAM 124 of the frame buffer memory 112 (FIG. 1). Processing by the pixel source selection and control unit 204 is stopped upon receipt of a halt control signal from a cache controller 208. Finally, the pixel source selection and control unit 204 supplies pixel data when required to the host interface 128 via the P-bus, and supplies pixel data (received from whatever source) and valid flags (to be discussed momentarily) to a data conversion section 212.

The data conversion section 212 translates the logical pixel location (identified in received pixel data) to a physical location in frame buffer memory space, and also converts pixel data into a format suitable for the frame buffer memory 112 (FIG. 1). The resulting pixel data along with valid flags are supplied to the cache controller 208. Receipt of a halt signal from the cache controller 208 causes stoppage of processing by the data conversion section 212.

The cache controller 208, in response to the pixel data and valid flags received from the data conversion section 212, produces a series of SRAM and DRAM commands to enable accessing the required pixels in the frame buffer memory 112 (FIG. 1). The SRAM commands are applied to SRAM control line 216 and the DRAM commands are supplied to a DRAM controller 220. Pixel data is supplied to pixel data lines 224 for transmittal either to the pixel source selection and control unit 204 or to the SRAM 124 of the frame buffer memory 112 (FIG. 1).

A video controller 228 supplies DRAM command data to the DRAM controller 220 to effectuate loading of the video buffer 140 of the frame buffer memory 112 with pixels for supply to the video display 116, in a conventional manner.

The DRAM controller 220 receives DRAM command data from the cache controller 208 and from the video controller 228 and produces DRAM control signals for application to DRAM 120 of the frame buffer memory 112 to control reading and writing of pixel data from and to DRAM.

The frame buffer controller 136 could be implemented as a special purpose controller with components as described, such as Evans & Sutherland's REALimage 2100 graphics processor, or a suitably programmed microcontroller.

Figure 3:
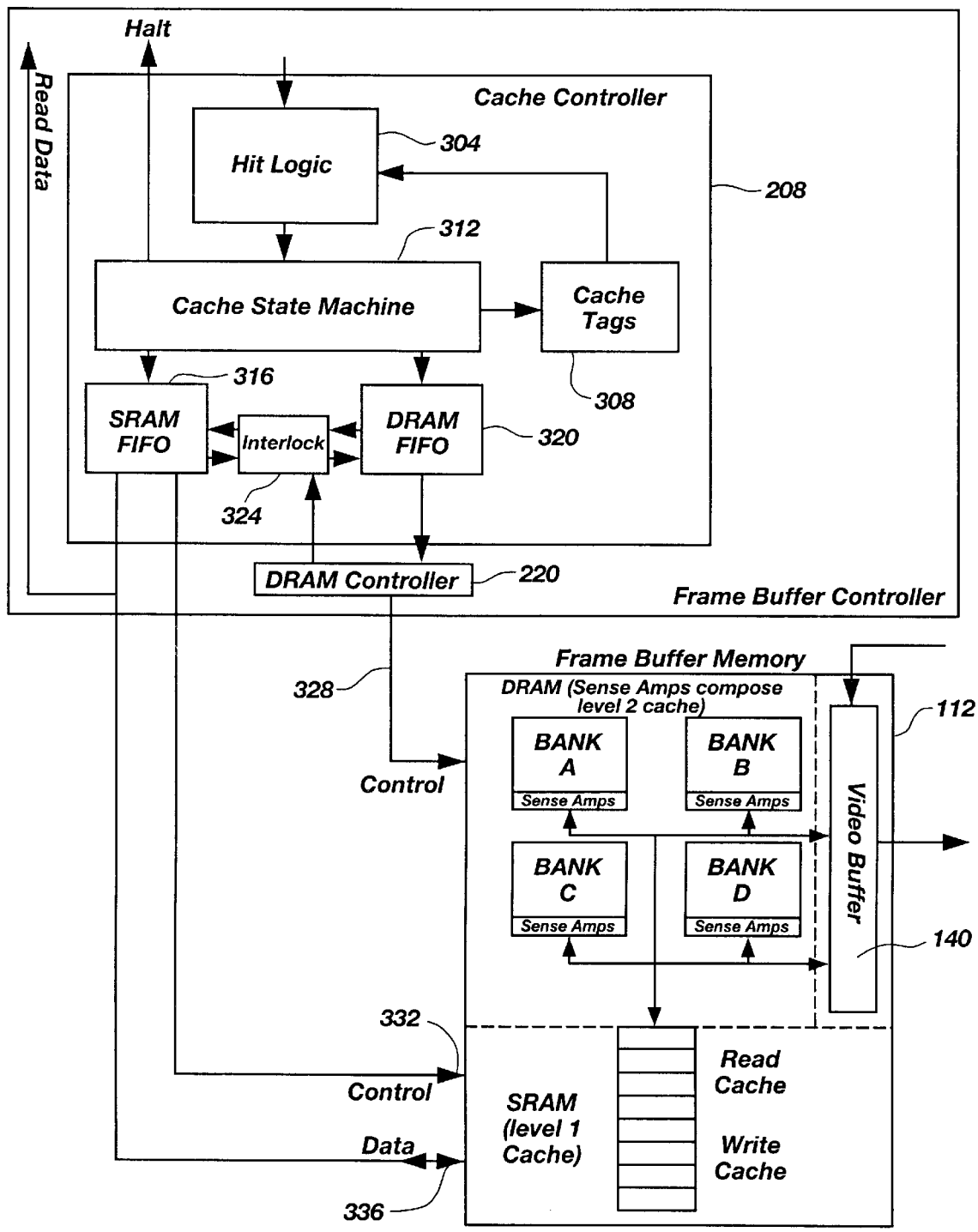
FIG. 3 is a schematic diagram of a preferred embodiment of a cache controller and frame buffer memory in accordance with the present invention.

Referring now to FIG. 3, there is shown a schematic diagram of the cache controller 208 (FIG. 2) and frame buffer memory 112 (FIG. 1). The cache controller 208 includes hit logic 304 which determines whether pixel data to be accessed are "hits" (already resident in cache) or "misses" (not already resident in cache) in the frame buffer memory 112. The hit logic 304 also determines which portions of cache memory are currently being accessed, which portions will be accessed by commands that are in process (sent but not yet executed), and which portions are no longer needed and must be written back to DRAM and/or may be replaced by new data. These determinations are made from received pixel data and valid flags from the data conversion section 212 (FIG. 2) and from cache status data represented by cache tags stored in cache tag memory 308, and sends pixel data and hit and miss flags to a cache state machine 312.

Cache tags contain flags (indicating status of slots in cache) and addresses (where data is read from or to be written into) and are formulated from control data from the cache state machine 312 which indicates changes being made to the cache by the state machine.

The cache state machine 312 processes the hit and miss data received from the hit logic 304 to produce SRAM and DRAM commands necessary for loading and unloading the caches and to access pixel data in the frame buffer memory 112. The SRAM commands and pixel data are sent to an SRAM FIFO memory 316, and the DRAM commands are sent to a DRAM FIFO memory 320.

The cache controller 208 could be implemented as a special purpose controller such as the aforementioned Evans & Sutherland REALimage 2100 graphics processor, or a suitably programmed microcontroller.

The SRAM FIFO memory 316 functions as an expandable and collapsible pipeline to the cache memory portion of the frame buffer memory 112. Reading of the commands and pixel data stored in SRAM FIFO memory 316 is carried out under control of an interlock unit 324. The interlock unit 324 also controls reading of commands from DRAM FIFO memory 320 to the DRAM controller 220, as will be discussed in more detail later. Employment of separate SRAM FIFO 316 and DRAM FIFO 320 allows for the simultaneous access of the DRAM portion and SRAM portion of the frame buffer memory 112.

The frame buffer memory 112 architecture is generally described in the previously referenced Deering et al article. The frame buffer memory 112 includes a DRAM portion composed of four banks of memory which constitute the primary storage area for pixels which define the images to be produces on the video display unit 116 (FIG. 1) each bank of memory includes an independent group of sense amps which holds a page of data from the DRAM. These sense amps together function as a level two cache. Before pixel data is transferred to or from the SRAM portion of the frame buffer memory or the video buffer, the data must be present in the sense amps. Data is loaded from a memory bank to the sense amps with an "access page" command on the DRAM control line 328. Data written into the sense amps is simultaneously written into the corresponding page in the DRAM memory. Prior to loading a new page of data into the sense amps, a "pre-charge" command is performed on the corresponding memory bank which de-activates the page in the sense amps. Pixel data is transferred in blocks from the sense amps to the video buffer 140 or the SRAM portion of the frame buffer memory. Each set of sense amps has an "active" flag stored in the cache tags 308 that indicates whether the sense amps contain a valid page of data or the sense amps have been precharged.

The SRAM cache memory functions as temporary storage for data to be accessed by the frame buffer controller 136 (FIG. 1). The SRAM memory is divided into a read cache portion and a write cache portion and pixels to be accessed by the frame buffer controller 136 are written and read through control port 332 and data port 336 of the SRAM portion. Transfer of blocks of data to and from DRAM are controlled with "read block" and "write block" commands received from DRAM controller 220 and any block from any bank of DRAM may be read from or written to any block (slot) in the SRAM caches.

Figure 4:
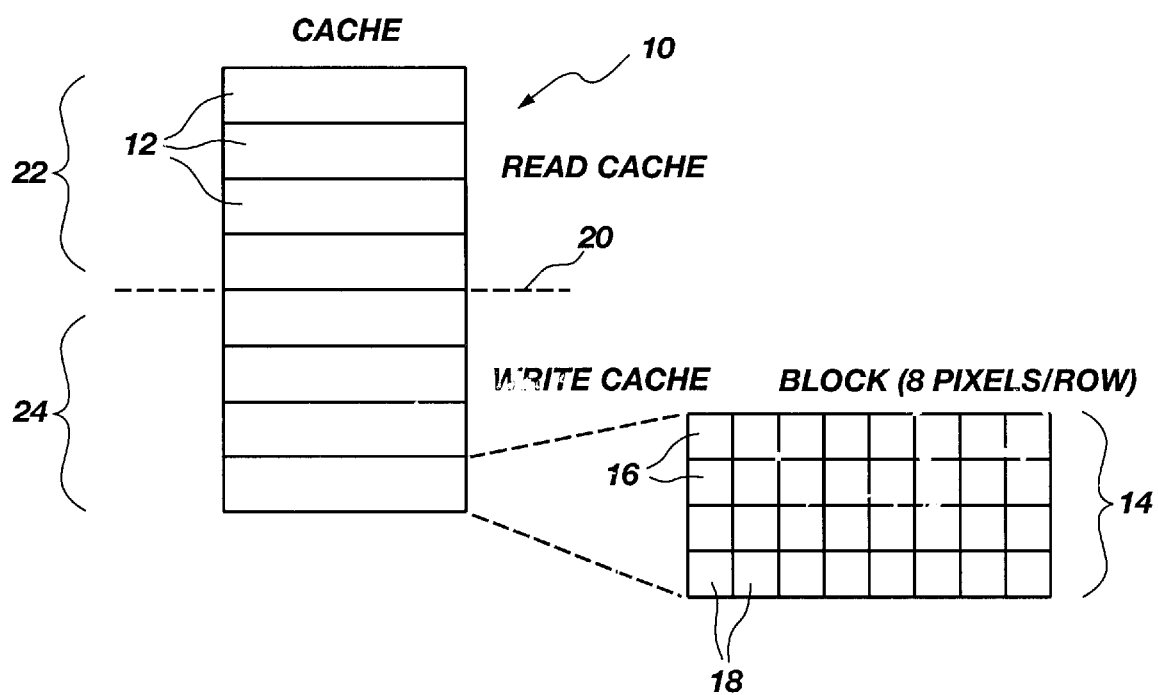
FIG. 4 is an illustration of the presently preferred embodiment of cache as it is used in accordance with the present invention, including a separate read and write cache.

FIG. 4. illustrates in more detail the structure of the cache portion 10 of the frame buffer memory 112 to include eight slots 12 in the SRAM, Each slot 12 can hold one block 14 of data, wherein each block 14 is comprised of four rows 16 of eight pixels 18 each.

The cache 10, as already described, is divided into two portions, one functioning as a separate read cache 22, and the other functioning as a separate write cache 24. Implementation of read and write caches 22, 24 as separate units provides significant advantages, as has been explained and will be further explained later.

It was noted earlier that the prior art teaches that all data is read from the DRAM to the cache, and written back to DRAM to maintain currency of the data in the DRAM. However, this occurs regardless of the actual type of data that is being transferred and stored.

The presently preferred embodiment separates a read path from a write path to enable more selective manipulation of data, which reduces bus traffic. However, some cache operations do not change. For example, each read operation or any read-modify-write operation requires that data be read from the DRAM into one of the slots 12 of the SRAM 10. If the SRAM contents have been changed (written to), that block must be written back to the DRAM before the SRAM memory space can be reused. Therefore, the cache function exists because SRAM accesses are faster than DRAM accesses. Generally, performance of such a caching system is not impacted because DRAM accesses are performed in parallel with the SRAM accesses to previous pixels.

Separating the cache into a read portion and a write portion enables reading into cache only those blocks that are required to be read. Likewise, it also enables writing into DRAM from cache only those blocks that must be written. This feature is implemented through cache tags or flags briefly mentioned earlier.

Slots 12 of the cache of FIG. 4 have associated with them several types of flags. These flags include the "pending" flag, the "pre-read" flag, the "full" flag, the "empty" flag, and the "dirty" flag. Use of the flags will now be shown in the explanation of FIGS. 5 and 6.

Figure 5:
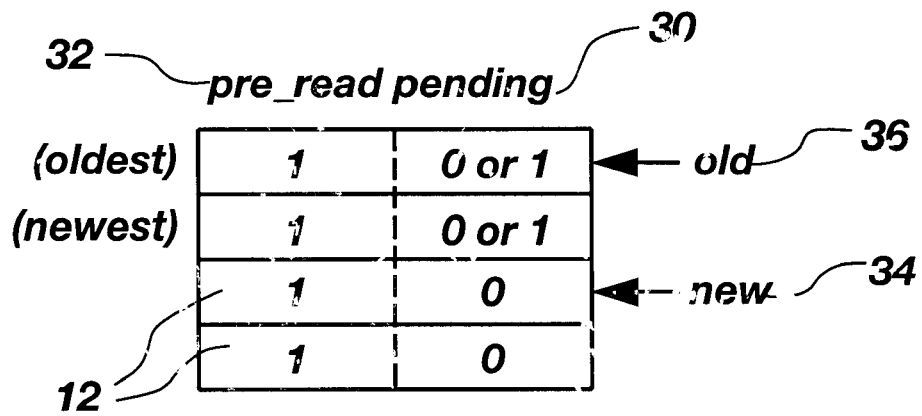
FIG. 5 is provided to illustrate the advantages of the separate read cache, including flags which indicate the status of the data stored in the read cache.

FIG. 5 is provided to illustrate the advantages of the separate read cache 22. If an access to a particular slot 12 of SRAM is in the SRAM FIFO pipeline 316 (FIG. 3), but not yet completed, a "pending" flag 30 is set for that slot. If the slot 12 was read from the DRAM, then a "pre-read" flag 32 is set for that slot 12. If, however, a slot 12 is used for writing only, the "pre-read" flag will be clear. A "new" pointer 34 is shown as pointing to the next available space memory. An "old" pointer 36 is shown as pointing to the next slot to free up. The cache controller 208 determines whether the data stored in the cache slot is read only. When the data is read only, it never has to be written back to the DRAM. This can save a substantial amount of time, and reduce bus traffic accordingly.

Figure 6:
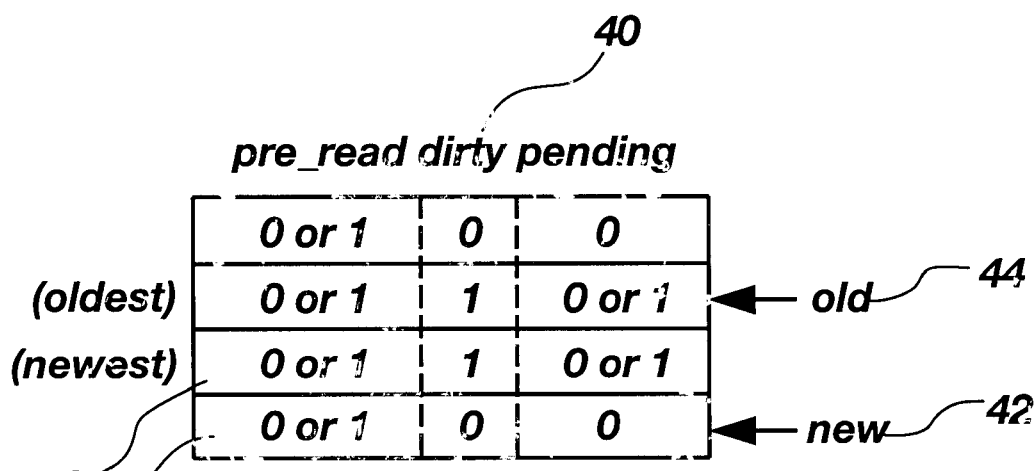
FIG. 6 is provided to illustrate the advantages of the separate write cache, including flags which indicate the status of the data stored in the write cache.

FIG. 6 shows that the write cache 24 is implemented slightly differently because of the nature of the data. If a slot 12 of the write cache 24 has been changed, and needs to be written to the DRAM, a "dirty" flag is set for that slot until the data is written back to the DRAM. As in the case of the read cache 22, each cache will have a "new" pointer 42 pointing to the next available slot, and an "old" pointer 44 pointed to the next slot to free up.

The tables of FIGS. 5 and 6 are a useful reference when considering what occurs during pre-reads, pre-read collisions, hits, no hits, block reuse, and synchronization of SRAM and DRAM ports, and this will now be discussed. Pre-reads occur, for example, when some memory accesses need a copy of a block of data stored in the DRAM. These pixel pre-read conditions exist if (1) the access is a read, (2) the access is a read-modify-write operation (such as for blending writes), or (3) a mask is being used to write only parts of a pixel.

In the cases above, the cache controller 208 will set the pixel pre-read flag. This requires the use of a pre-read SRAM slot. If the block is used for a write operation only, such as a BLT destination, then the first access will be a "state full" initial write operation, which will clear all the dirty tags. Advantageously, when the block is written back to DRAM, only the pixels that have been written into SRAM will be written back to the DRAM.

Another condition that must be accounted for is the pre-read collision. This situation arises if, for example, a pre-read pixel needs a block that already exists as a dirty, non-pre-read block. The required pre-read function cannot occur until the dirty block is written back to DRAM. However, it is now understood that the dirty block will be written back to DRAM only after waiting for the cache pipeline to flush.

Turning now to the condition of cache hits, when the frame buffer is needed, the read and write caches must both be checked for a match, or "hit". If there is an address match on any of the pending slots of the write cache, a hit condition exists, and no DRAM access is required. The data will be read from the slot. On the other hand, if the access is a "read", and there is not a match in the write cache, then the read cache is checked for an address match on a pending slot. If an address match is found, a hit condition exists again, and no DRAM access is needed.

It is important to recognize that when looking for a hit condition, it is necessary to check the write cache first. This prevents reading old data from the DRAM when the most up-to-date data is still in the write cache waiting to be written back to the DRAM.

The no-hit condition occurs when neither the read nor the write cache have a matching pixel address. In this case, access to DRAM begins with a DRAM request. The DRAM request is written into the DRAM FIFO 320, while simultaneously a pixel data access is written into the SRAM FIFO 316 (FIG. 3). However, if the SRAM FIFO 316 is not empty, the present invention can process in parallel. In other words, previous pixels in the SRAM FIFO 316 are serviced while the DRAM accesses in the DRAM FIFO 320 are being completed for the current pixels. Essentially, the parallel processing hides the DRAM accesses from the flow of pixel data accesses.

Efficient reuse of blocks is another important function of the present invention. During a BLT, it is common to read from a first block, write to a different block, and then read from the first block again. It is advantageous to recognize at this point that the data in the SRAM is still valid. Accordingly, it is not necessary to access DRAM again if this condition is recognizable. Thus, if the access is a read, and no hit has been detected in either the read or write cache, the next step is to determine if the last slot that was made available on the read side is a hit, and the pre-read flag is set. Remember, the pre-read flag is always set on the read side except as an initial condition after reset. If there is a hit, an "old" counter is decremented by the hit logic 304 (FIG.3), and that slot is reused.

However, in the case of the access being a pre-read write, it is first determined if the pre-read flag is set, and if the last slot made available in the write cache is a hit. If there is a hit, the "old" counter is decremented, and that slot is reused. If the last slot made available in the write cache was not a pre-read write, then the slot is not reused.

The interlock logic 324 (FIG. 3) was briefly mentioned earlier and now will be discussed in more detail. As mentioned earlier, the interlock logic 324 controls synchronization of SRAM FIFO 316 and DRAM FIFO 320. In this connection, if a pixel is a miss in the cache, it is dropped into the SRAM FIFO 316 with its sync flag set. This indicates that it was a cache miss, and must not be executed until the proper slot is loaded. At the same time that the pixel is dropped into the SRAM FIFO, the cache controller 208 loads the required block into the proper cache slot via the DRAM controller. The cache state machine 312 issues commands to the DRAM FIFO 320 when the functions of "access page" and "read block," are to be performed. Specifically, "access page" is performed when there is a block-miss/page hit condition, and "read block" is performed when there is a block-miss/page-miss condition.

The final DRAM command that is required to load the slot in the SRAM FIFO is also accompanied by a sync flag indicating that on completion of this DRAM command, the SRAM FIFO command with the corresponding sync flag may be executed.

For every cache miss, a set of DRAM commands is written into the DRAM FIFO with a sync flag "set" accompanying the last of such commands, and the SRAM access command that must wait for the completion of these DRAM commands is written into the SRAM FIFO with a sync flag "set" accompanying the access command. SRAM FIFO reads are halted if an SRAM sync flag is at the output of the SRAM FIFO before its corresponding DRAM command with sync flag set is completed. A sync counter (in the interlock unit 324) counts how many DRAM commands with sync set are completed before their corresponding SRAM access command (with sync flag set) is ready. The sync counter is decremented when the SRAM access command with sync flag set is read from the SRAM FIFO. This sync counter allows commands in the DRAM FIFO to continue irrespective of the condition of the SRAM FIFO.

Accordingly, the steps of (1) executing the commands stored in the SRAM FIFO 316, and then (2) reading data from the next SRAM FIFO location are only performed when any of the following conditions is met. The first condition is when the SRAM sync flag is not set, i.e., there is a hit. The second condition is when the sync counter is greater than 0. This means that the DRAM commands have already been executed. Accordingly, the sync counter is decremented. The third condition is when the DRAM sync flag is set, and the last of the corresponding DRAM commands has finished executing. In this case, the sync counter is left at 0.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. In a computer graphics system for developing video images for display on a video display device, a cache control system, comprising:

a frame buffer memory having:
   a first memory for storing pixel data for ultimate supply to the video display device, and
   a cache memory for storing data received from the first memory, data which is to be written into the first memory, and data received from a cache controller, and a cache controller coupled to the cache memory for controlling access thereto, the cache controller comprising:
   a cache first in, first out (FIFO) memory pipeline for temporarily storing pixel data prior to supply thereof to the cache memory and adapted to temporarily store cache commands for supplying to the cache memory, along with any pixel data then stored in the cache FIFO memory, to cause the cache memory to store said any pixel data, to store data received from the first, or write data into the first memory, wherein said cache controller further includes a first command first in, first out (FIFO) memory for temporarily storing first commands for supply to the first memory to cause the first memory to store pixel data received from cache memory or write data into the cache memory.

2. In a computer graphics system for developing video images for display on a video display device, a cache control system comprising a frame buffer memory having
   a first memory for storing pixel data for ultimate supply to the video display device, and
   a cache memory for storing data received from the first memory, data which is to be written into the first memory, and data received from a cache controller, and a cache controller, coupled to the cache memory for controlling access thereto, the cache controller comprising:
   a cache first in, first out (FIFO) memory pipeline for temporarily storing pixel data prior to supply thereof to the cache memory and adapted to temporarily store cache commands for supplying to the cache memory, along with any pixel data then stored in the cache FIFO memory, to cause the cache memory to store said any pixel data, to store data received from the first memory, or write data into the first memory, wherein said cache controller further includes a first command first in, first out (FIFO) memory for temporarily storing first commands for supply to the first memory to cause the first memory to store pixel data received from the cache memory or write data into the cache memory; and
   an interlock means, coupled to the cache FIFO memory and the first command FIFO memory, for controlling and synchronizing the reading of pixel data and cache commands from the cache FIFO memory, and the reading of first commands from the first command FIFO memory, such that for any particular pixel data access to the frame buffer memory, the first commands are read from the first command FIFO memory prior to the reading of the cache commands and pixel data from the cache FIFO memory.

3. A cache control system as in claim 2 wherein said interlock means is adapted to cause the reading of pixel data and cache commands from the cache FIFO memory if no first commands are stored in the first command FIFO memory.

4. A cache control system as in claim 3 wherein said interlock means includes a sync counter that increments when the last of the first commands stored in the first command FIFO memory is read, and decrements when, following the incrementing, the first of the corresponding cache commands stored in the cache FIFO memory is read.

5. A cache memory control system for controlling accesses to a frame buffer of a computer graphics display system which generates images from pixel data for display on a video display unit, said control system including:

a frame buffer memory comprising
  a graphics memory for storing pixel data for supply to the video display unit to enable generation of images for display,
  a read cache memory for storing data received from the graphics memory, and
  a write cache memory for storing data received externally of the frame buffer and data that is to be written into the graphics memory, and
a frame buffer controller for controlling writing of data into and reading of data from the frame buffer memory, and the transfer of data between the graphics memory and read cache memory, and between the graphics memory and write cache memory, wherein said frame buffer controller includes
  a cache first in, first out (FIFO) memory pipeline for temporarily storing pixel data and cache commands prior to supply thereof to the read and write cache memories to cause the read cache memory to store data received from the graphics memory, and cause the write cache memory to store the pixel data to be written into the graphics memory;
  a graphics command first in, first out (FIFO) memory for temporarily storing graphics commands for supply to the graphics memory to cause the graphics memory to store pixel data received from the write cache memory or write data into the read cache memory and write cache memory.

6. A cache memory control system for controlling accesses to a frame buffer of a computer graphics display system which generates images from pixel data for display on a video display unit, said control system including
a frame buffer memory comprising
  a graphics memory for storing pixel data for supply to the video display unit to enable generation of images for display,
  a read cache memory for storing data received from the graphics memory, and
  a write cache memory for storing data received externally of this frame buffer and data that is to be written into the graphics memory, and
a frame buffer controller for controlling writing of data into and reading of data from the frame buffer memory, and the transfer of data between the graphics memory and read cache memory, and between the graphics memory and write cache memory, said frame buffer controller includes
  a cache first in, first out (FIFO) memory pipeline for temporarily storing pixel data and cache commands prior to supply thereof to the read and write cache memories to cause the read cache memory to store data received from the graphics memory, and cause the write cache memory to store the pixel data to be written into the graphics memory;
  a graphics command first in, first out (FIFO) memory for temporarily storing graphics commands for supply to the graphics memory to cause the graphics memory to store pixel data received from the write cache memory or write data into the read cache memory and write cache memory; and
  interlock logic coupled to the cache FIFO memory and graphics FIFO memory for causing the reading of graphics commands to the graphics memory, for any particular pixel data access, prior to the reading of corresponding cache commands and pixel data to the read and write cache memories.

7. A control system as in claim 6 wherein said interlock logic is adapted to allow graphics memory accesses from the graphics FIFO memory for successive pixel data, while the read and write cache memories are being accessed from the cache FIFO memory for current pixel data.

8. A method for controlling access to a cache memory system of a computer graphics system for developing video images for display on a video display device, said method comprising the steps of:

(1) providing a frame buffer having a separate read cache memory for storing data received from a graphics system memory, and a separate write cache memory for storing data that is to be written to the graphics system memory;

(2) storing pixel data in a cache first in, first out (FIFO) memory pipeline for supply to the write cache memory;

(3) storing cache commands in the cache FIFO memory for supply, along with the pixel data, to the read and write cache memories, (4) storing graphics commands in a graphics first in, first out (FIFO) memory for supply to the graphics system memory, and (5) providing an interlock unit for controlling and synchronizing the reading of pixel data and cache commands from the cache FIFO memory, and the reading of graphics commands from the graphics FIFO memory so that for any pixel data access, the graphics commands are read prior to the reading of the corresponding pixel data and cache commands.

9. A method for controlling access to a cache memory system of a computer graphics system for developing video images for display on a video display device, said method comprising the steps of:

(1) providing a frame buffer having a separate read cache memory for storing data received from a graphics system memory, and a separate write cache memory for storing data that is to be written to the graphics system memory;

(2) storing pixel data in a cache first in, first out (FIFO) memory pipeline for supply to the write cache memory;

(3) storing cache commands in the cache FIFO memory for supply, along with the pixel data, to the read and write cache memories, (4) storing graphics commands in a graphics first in, first out (FIFO) memory for supply to the graphics system memory, (5) assigning a flag to data in the cache FIFO memory that needs to be written back to the graphics system memory; and (6) preventing certain data from being written back to the graphics system memory.

10. A method for controlling access to a cache memory system of a computer graphics system for developing video images for display on a video display device, said method comprising the steps of:
- (1) providing a frame buffer having a separate read cache memory for storing data received from a graphics system memory, and a separate write cache memory for storing data that is to be written to the graphics system memory;
- (2) storing pixel data in a cache first in, first out (FIFO) memory pipeline for supply to the write cache memory.
- (3) storing cache commands in the cache FIFO memory for supply, along with the pixel data, to the read and write cache memories,
- (4) storing graphics commands in a graphics first in, first out (FIFO) memory for supply to the graphics system memory,
- (5) storing flags indicating whether the different locations in the read cache memory and write cache memory contain pixel data,
- (6) determining from the flags, for pixel data to be loaded in cache FIFO memory, first whether a hit condition exists in write cache memory and second whether a hit condition exists in read cache memory, and
- (7) preventing the reading of data from the graphics system memory into the read cache memory if a hit condition exists in write cache memory, and causing the writing of pixel data from the write cache memory to the graphics system memory.

11. The method as defined in claim 9 further comprising the step of:
- (12) supplying the pixel data from cache FIFO memory to the write cache memory if a hit condition does not exist (miss) in cache memory.

* * * * *